United States Patent
Watanabe et al.

(10) Patent No.: US 10,742,853 B2
(45) Date of Patent: Aug. 11, 2020

(54) IMAGE SENSOR AND BODY MODULE

(71) Applicant: OMRON Corporation, Kyoto (JP)

(72) Inventors: Kosuke Watanabe, Kusatsu (JP); Yasuhito Uetsuji, Kusatsu (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/190,165

(22) Filed: Nov. 14, 2018

(65) Prior Publication Data

US 2019/0268520 A1    Aug. 29, 2019

(30) Foreign Application Priority Data

Feb. 23, 2018   (JP) ................ 2018-031116

(51) Int. Cl.
| | |
|---|---|
| H04N 5/225 | (2006.01) |
| H04N 5/238 | (2006.01) |
| H04N 5/232 | (2006.01) |
| H04N 5/235 | (2006.01) |
| H04N 5/357 | (2011.01) |
| G03B 17/14 | (2006.01) |

(52) U.S. Cl.
CPC ......... *H04N 5/22521* (2018.08); *G03B 17/14* (2013.01); *H04N 5/238* (2013.01); *H04N 5/2351* (2013.01); *H04N 5/23209* (2013.01); *H04N 5/23229* (2013.01); *H04N 5/23296* (2013.01); *H04N 5/3572* (2013.01)

(58) Field of Classification Search
CPC .......... H04N 5/22521; H04N 5/23229; H04N 5/23296; H04N 5/2351; H04N 5/238
See application file for complete search history.

(56) References Cited

U.S. PATENT DOCUMENTS

| | | | |
|---|---|---|---|
| 2002/0094131 A1 | 7/2002 | Shirakawa | |
| 2009/0051792 A1* | 2/2009 | Arimoto | ................ G03B 17/14 |
| | | | 348/251 |
| 2011/0228163 A1 | 9/2011 | Isaka et al. | |
| 2013/0111464 A1* | 5/2013 | Markas | .................... G06F 8/41 |
| | | | 717/174 |
| 2017/0188013 A1 | 6/2017 | Presler | |

FOREIGN PATENT DOCUMENTS

| | | |
|---|---|---|
| CN | 1366423 | 8/2002 |
| CN | 1914580 | 2/2007 |
| JP | 2003169255 | 6/2003 |
| JP | 2007-214682 | 8/2007 |
| JP | 4614601 | 1/2011 |

OTHER PUBLICATIONS

"Search Report of Europe Counterpart Application", dated Jun. 5, 2019, p. 1-p. 8.
"Office Action of China Counterpart Application", dated Jun. 18, 2020, with English translation thereof, pp. 1-15.

* cited by examiner

*Primary Examiner* — Tsion B Owens
(74) *Attorney, Agent, or Firm* — JCIPRNET

(57) ABSTRACT

The disclosure provides an image sensor capable of performing a good shading correction on the imaging result regardless of the combination of the used lens module and imaging module. The body module of the image sensor obtains the format information of each module from the attached imaging module and lens module and performs on the image data from the imaging module the shading correction in accordance with the shading correction information associated with the combination of the obtained format information.

6 Claims, 6 Drawing Sheets

| x coordinate | 1 | 2 | --- | 319 | 320 | 321 | --- | 639 | 640 |
|---|---|---|---|---|---|---|---|---|---|
| Correction gain | x2.01 | x1.90 | --- | x1.02 | x1.00 | x1.02 | --- | x1.90 | x2.00 |
| y coordinate | 1 | 2 | --- | 239 | 240 | 241 | --- | 479 | 480 |
| Correction gain | x1.71 | x1.69 | --- | x1.02 | x1.00 | x1.02 | --- | x1.69 | x1.70 |

IMAGE SENSOR AND BODY MODULE

CROSS REFERENCE TO RELATED APPLICATION

The disclosure claims priority under 35 U.S.C. § 119 to Japanese Application No. 2018-031116 filed Feb. 23, 2018, the entire content of which is incorporated herein by reference.

BACKGROUND

Technical Field

The disclosure relates to a modular image sensor configured by a combination of multiple modules and to a body module of the image sensor.

Description of Related Art

In the production line of a factory, a system called image sensor is frequently used for automating inspection and management of products and saving labors. In the past, a configuration that connects a camera and an image processing device with a cable is commonly used for the system (see Patent Document 1). However, recently, a processing-integrated image sensor has also been launched and the image sensor integrates the camera and the image processing device together so as to capture images and process the captured images with a single device. Such a processing-integrated image sensor is also called a "smart camera", which may be and may be formed by integrating illuminations and lenses.

Depending on a size of an object to be inspected, an installation environment of an image sensor, etc., an angle of view desired for a smart camera and a resolution of an imaging result (image data) are different. Therefore, manufactures who provide smart cameras have lined up a large number of products, with specifications different in angle of view, etc., for the user to select the one with the optimum specification.

However, as the IoT development of factories is accelerating, the range of application of smart cameras has been expanded, and it is becoming difficult to provide product variations that cover the diverse user needs. Further, in order to be distinguished from the competitors in product competition, more mass customization and seasonal products are offered to meet the preference of each customer and the life cycle of the products of digital devices typified by smart phones is shortening, and there is an increasing need for partially changing the illuminations and lenses, etc. to be optimized for the inspection as the change of the object to be inspected enters a short cycle. Thus, it is conceivable that the optical system and the imaging element of the smart camera are respectively modularized, and the user can freely combine the optical system and the imaging element.

However, depending on the combination of the optical system and the imaging element, the contents of the shading correction to be performed on the imaging result are different. Therefore, if a smart camera is simply modularized, it is not possible to realize a smart camera which performs a good shading correction on the imaging result regardless of the combination of the used optical system and imaging element.

Related Art is disclosed in patent application, Japanese Laid-open No. 2007-214682.

SUMMARY

The disclosure has been made in view of the above circumstances, and it is one aspect of some embodiments of the disclosure to provide an image sensor and a body module of the image sensor. The image sensor is configured by a body module, a lens module and an imaging module, where the lens module and the imaging module are attached to the body module. The image sensor can perform a good shading correction on the imaging result regardless of the combination the used lens module and imaging module.

An image sensor according to an aspect of the disclosure includes a body module and a lens module and an imaging module attached to the body module. Further, the body module of the image sensor according to an aspect of the disclosure includes an obtaining part, a correction part, a correction part and a setting part. The obtaining part obtains from the attached imaging module a format information indicating a format of the imaging module and obtains from the attached lens module a format information indicating a format of the lens module. The correction part is capable of setting shading correction information and performing a shading correction on image data outputted by the imaging module according to the set shading correction information. The setting part obtains the shading correction information from a predetermined device and sets in the correction part the shading correction information associated with the combination of the format information of the imaging module and the format information of the lens module obtained from the obtaining part. The predetermined device stores the shading correction information to be set in the correction part for each combination of the format information of the imaging module and the format information of the lens module.

Further, a body module according to another aspect of the disclosure is configured to be attachable by a lens module and an imaging module. The body module includes an obtaining part, a correction pail, a correction part and a setting part. The obtaining part obtains from the attached imaging module a format information indicating a format of the imaging module and obtains from the attached lens module a format information indicating a format of the lens module. The correction part is capable of setting shading correction information and performing a shading correction on image data outputted by the imaging module according to the set shading correction information. The setting part obtains the shading correction information from a predetermined device and sets in the correction part the shading correction information associated with the combination of the format information of the imaging module and the format information of the lens module obtained from the obtaining part. The predetermined device stores the shading correction information to be set in the correction part for each combination of the format information of the imaging module and the format information of the lens module.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
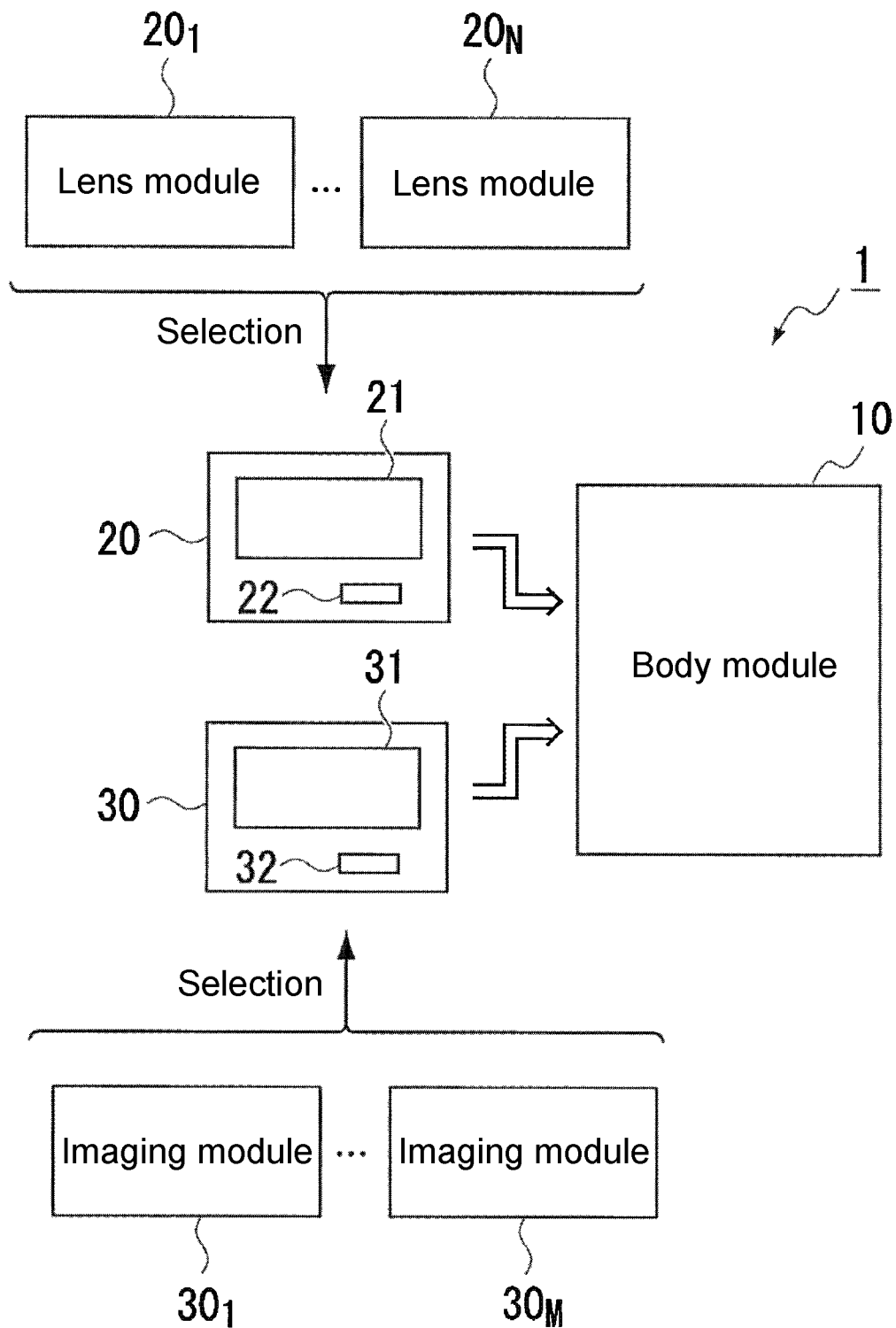
FIG. 1 is a diagram illustrating a schematic configuration of the image sensor according to the first embodiment.

Hereinafter, embodiments of the disclosure will be described with reference to the drawings.

An image sensor according to an aspect of the disclosure includes a body module and a lens module and an imaging module attached to the body module. Further, the body module of the image sensor according to an aspect of the disclosure includes an obtaining part, a correction part, a correction part and a setting part. The obtaining part obtains from the attached imaging module a format information indicating a format of the imaging module and obtains from the attached lens module a format information indicating a format of the lens module. The correction part is capable of setting shading correction information and performing a shading correction on image data outputted by the imaging module according to the set shading correction information. The setting part obtains the shading correction information from a predetermined device and sets in the correction part the shading correction information associated with the combination of the format information of the imaging module and the format information of the lens module obtained from the obtaining part. The predetermined device stores the shading correction information to be set in the correction part for each combination of the format information of the imaging module and the format information of the lens module.

If the above configuration is adopted for the image sensor, the shading correction with contents in accordance with a combination of the lens module and the imaging module attached to the body module can be performed on the imaging result (the image data from the imaging module). Therefore, regardless of the combination of the lens module and the imaging module attached to the body module, the image data undergoing a good shading correction can be obtained.

Since the format information can be provided to the body module, the configuration equipped with each attached module (the lens module and the imaging module) may be any configuration. For example, each attached module may be provided with a memory for storing the format information indicating the format of its own module. Further, each attached module may be provided with a resistor having a resistance value according to the format of its own module, a dip switch in which each switch is turned on/off to indicate the format of its own module and a circuit or the like equivalent to the dip switch.

The "predetermined device" accessed by the setting part of the image sensor may be a nonvolatile memory included in the body module or a device outside the body module.

The following configuration may be adopted for the image sensor, in which "the body module, when the attached lens module is a zoomable lens module with adjustable zoom and aperture, further includes a setting adjustment part for adjusting settings of the zoom and the aperture of the zoomable lens module; and the predetermined device is stored with the shading correction information with respect to the combination of the format information of the zoomable lens module and the format information of the imaging module by each combination of a zoom setting value and an aperture setting value that can be set in the zoomable lens module; and the setting part of the body module, when the zoomable lens module is attached to the body module, obtains from the predetermined device and sets in the correction part the shading correction information associated with the format information of the imaging module and the format information of the lens module obtained from the obtaining part and associated with the combination of the zoom setting value and the aperture setting value of the zoomable lens module." If this configuration is adopted for the image sensor, even when the user selects the zoomable lens module, the image sensor can perform a good shading correction.

Further, a body module according to another aspect of the disclosure is configured to be attachable by a lens module and an imaging module. The body module includes an obtaining part, a correction part, a correction part and a setting part. The obtaining part obtains from the attached imaging module a format information indicating a format of the imaging module and obtains from the attached lens module a format information indicating a format of the lens module. The correction part is capable of setting shading correction information and performing a shading correction on image data outputted by the imaging module according to the set shading correction information. The setting part obtains the shading correction information from a predetermined device and sets in the correction part the shading correction information associated with the combination of the format information of the imaging module and the format information of the lens module obtained from the obtaining part. The predetermined device stores the shading correction information to be set in the correction part for each combination of the format information of the imaging module and the format information of the lens module.

According to the body module, it is possible to realize an image sensor capable of performing a good shading correction regardless of the combination of the used lens module and imaging module.

According to the disclosure, it is possible to provide a technique capable of performing a good shading correction on the imaging result regardless of the combination of the used lens module and imaging module.

First Embodiment

Figure 2:
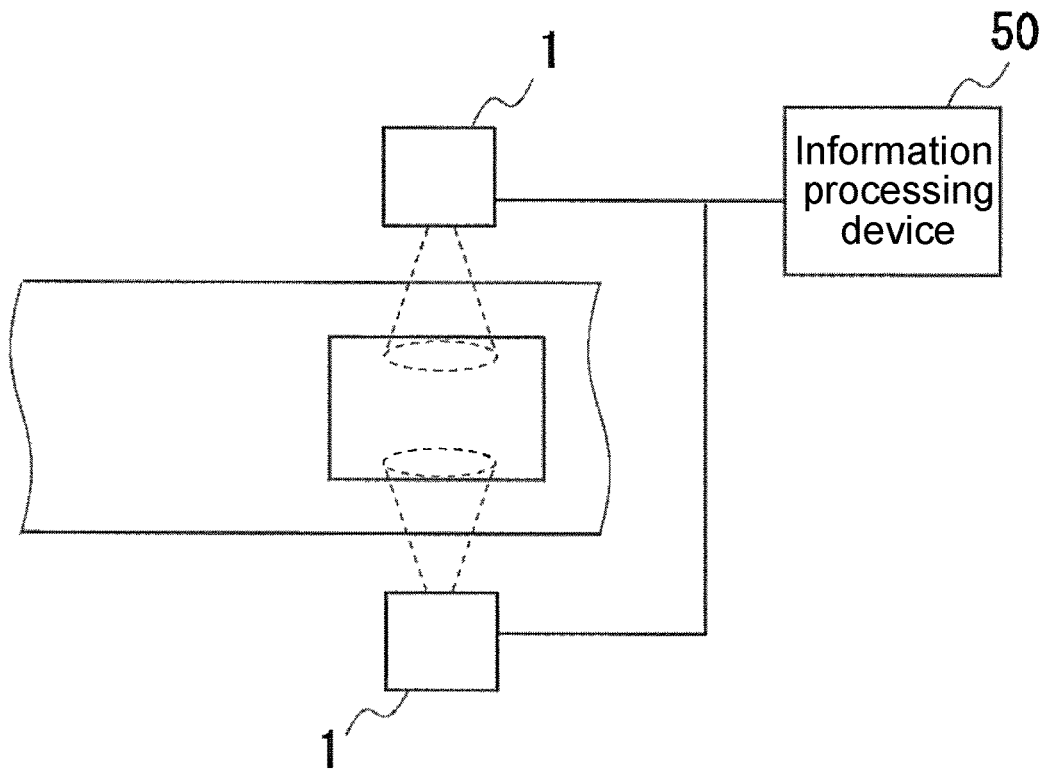
FIG. 2 is a diagram illustrating an example of use of the image sensor.

FIG. 1 shows a schematic configuration of an image sensor 1 according to the present embodiment, and FIG. 2 shows an example of use of the image sensor 1.

As shown in FIG. 1, the image sensor 1 of the present embodiment is a device configured by attaching a lens module 20 and an imaging module 30 to a body module 10.

Further, as shown in FIG. 2, the image sensor 1 is a device developed with the assumption that the image sensor 1 will be used in the form of being provided at multiple places of a production line or the like and in the form that processing results of each image sensor 1 will be collected by one information processing device 50.

The imaging module 30 (FIG. 1) is a module including an imaging element 31 such as a CMOS image sensor, a CCD image sensor, etc. M types of imaging modules $30_1$ to $30_M$ having different specifications (the pixel size, incident angle characteristics, etc. of the imaging element 31) are prepared as the imaging module 30 attachable to the body module 10. A nonvolatile memory 32 such as a serial EEPROM, etc. is provided in each imaging module 30, and the nonvolatile memory 32 of each imaging module 30 stores format information indicating the format of its own imaging module 30.

The lens module 20 is a module including an optical system 21 for imaging light from an object to be imaged onto an imaging surface of the imaging element 31. N types of lens modules $20_1$ to $20_N$ having different specifications (an exit pupil position, an exit pupil diameter, etc. of the optical system 21) are prepared as the lens module 20. A nonvolatile memory 22 such as a serial EEPROM, etc. is provided in each lens module 20, and the nonvolatile memory 22 of each lens module 20 stores format information indicating the format of its own lens module 20.

The body module 10 is a module for performing a shading correction on image data from the imaging module 30 and performing various processes (such as a reading process of barcode or the like, an abnormality presence/absence judging process, etc.) by analyzing the image data after the shading correction.

The degree of shading (luminance unevenness) occurring in the image data from a certain imaging module 30 varies with the specification of the imaging element 31 in the certain imaging module 30 and the specification of the optical system 21 which images incident light on the imaging surface of the imaging element 31. Therefore, if the contents of the shading correction performed by the body module 10 are fixed, the image sensor 1 capable of performing a good shading correction regardless of the combination of the attached lens module 20 and imaging module 30 cannot be obtained.

Figure 3:
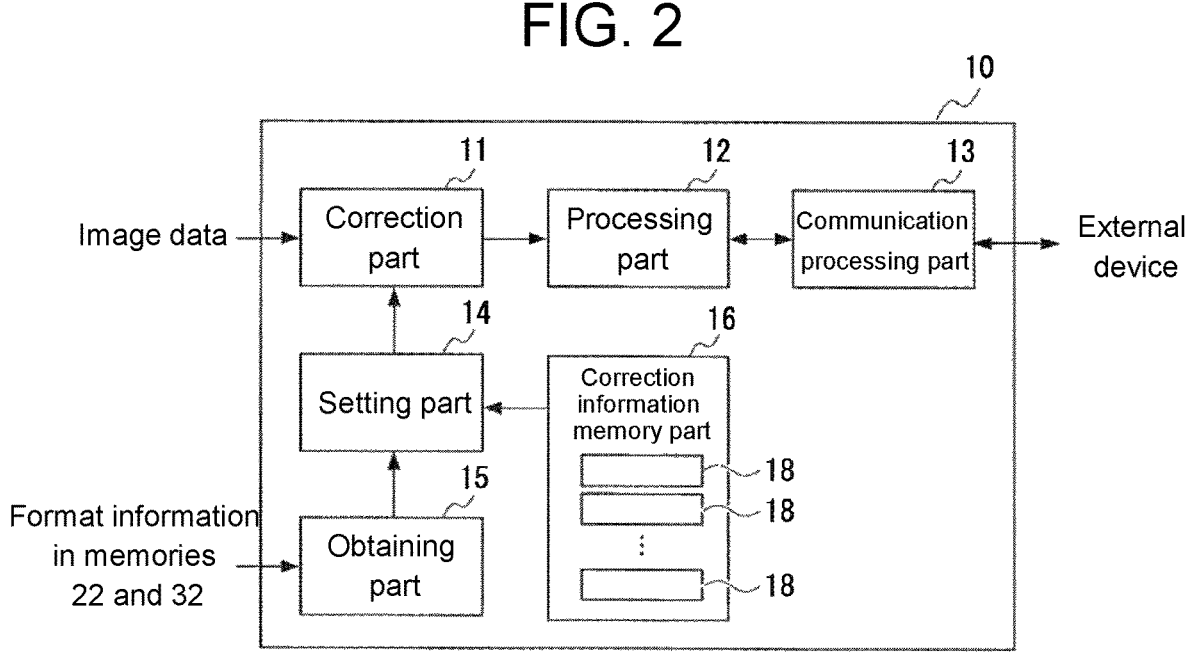
FIG. 3 is a functional block diagram for illustrating functions of a body module of the image sensor.

In order to be capable of performing a good shading correction for all combinations of the lens module 20 and the imaging module 30, the body module 10 of the image sensor 1 adopts the configuration shown in the functional block diagram of FIG. 3.

That is, the body module 10 includes a correction part 11, a processing part 12, a communication processing part 13, a setting part 14, an obtaining part 15, and a correction information memory part 16. The correction part 11 is realized by, for example, an image processing integrated circuit (IC), for example, a field programmable gate array (FPGA), an application-specific integrated circuit (ASIC), etc. and the communication processing part 13 is realized by, for example, a network interface circuit. Further, the correction information memory part 16 is realized by, for example, a rewritable nonvolatile memory with a relatively large capacity such as a flash memory, and the processing part 12, the setting part 14 and the obtaining part 15 are realized by, for example, micro-controllers stored with programs for the image sensor 1.

The correction part 11 is a unit for performing the shading correction on the image data from the imaging module 30. The correction part 11 is configured to be capable of setting shading correction information (details will be described below). The correction part 11 performs the shading correction with contents defined by the set shading correction information on the image data from the imaging module 30.

The processing part 12 is a unit for performing various processes (such as a reading process of code or the like, an abnormality presence/absence judging process, etc.) by analyzing the image data after the shading correction. The communication processing part 13 is a unit used by the processing part 12 for communicating with an external device (the information processing device 50).

The obtaining part 15 is a unit for reading the format information of each module from the nonvolatile memories 22 and 32 respectively in the lens module 20 and the imaging module 30 attached to the body module 10 at the time of turning on the power of the body module 10 or the like and notifying the setting part 14. Hereinafter, the format information of the lens module 20 stored in the nonvolatile memory 22 and the format information of the imaging module 30 stored in the nonvolatile memory 32 are referred to as a LM format information and a CM format information, respectively.

The setting part 14 is a unit for reading from the correction information memory part 16 and setting in the correction part 11 the shading correction information 18 associated with a combination of the LM format information and the CM format information notified by the obtaining part 15.

The shading correction information 18 associated with a certain combination of the LM format information and the CM format information in the correction information memory part 16 is information capable of satisfactorily reducing shading when set in the correction part 11 when the lens module 20 and the imaging module 30 identified by the certain combination are attached to the body module 10.

The shading correction information 18 stored in the correction information memory part 16 may be information of any configuration as long as it defines a correction gain to be multiplied by the luminance value of each pixel in the image data from the imaging module 30. For example, the shading correction information 18 may be information of the configuration shown in FIG. 4 (data structure). The shading correction information 18 (FIG. 4) is shading correction information for the imaging module 30 including the imaging element 31 which has the number of pixels of 640×480. The shading correction information 18 is configured by X direction correction information, which defines in each x coordinate the correction gain to be multiplied by the luminance value of each pixel having the y coordinate of 240, and Y direction correction information, which defines in each y coordinate the correction gain to be multiplied by the luminance value of each pixel having the x coordinate of 320.

Figures 4, 5:
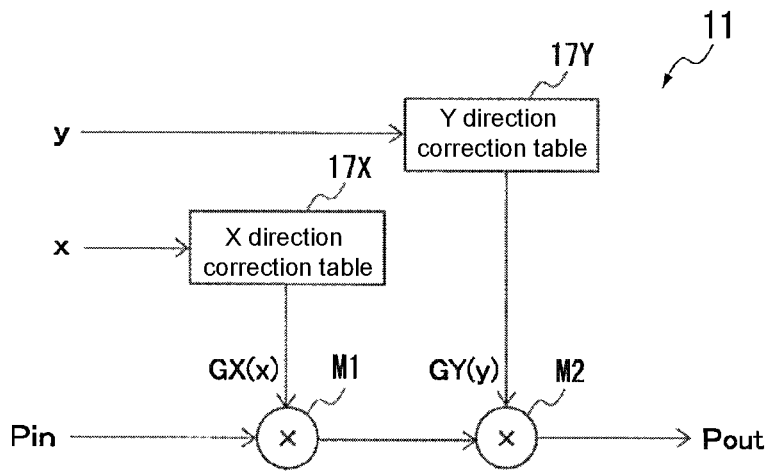
FIG. 4 is a diagram illustrating an example of shading correction information.
FIG. 5 is a diagram illustrating a configuration example of a correction part.

In the case of using the shading correction information 18 of the configuration shown in FIG. 4, the configuration shown in FIG. 5 may be adopted as the correction part 11. An X direction correction table 17X and a Y direction correction table 17Y included in the correction part 11 are tables (so-called look-up tables) in which the X direction correction information and the Y direction correction information in the shading correction information 18 (FIG. 4) are set, respectively. A multiplier M1 is a unit for multiplying the correction gain GX(x) associated with the coordinate x in the X direction correction information by the luminance value Pin of the pixel at the coordinates x, y. A multiplier M2 is a unit for multiplying the correction gain GY(y) associated with the coordinate y in the Y direction correction information by the output of the multiplier M1 and outputting it as a processing result Pout.

Information including the correction gain G(x, y) of each pixel at each coordinate may be adopted as the shading correction information 18, and a unit for multiplying G(x, y) by the luminance value Pin of the pixel at the coordinates x, y may be adopted as the correction part 11.

Also, the generation procedure of the shading correction information 18 is not particularly limited. For example, the shading correction information 18 may be generated by calculating the correction gain for each pixel from experimental results. Further, the shading correction information 18 may be generated by calculating the correction gain for each pixel from the exit pupil position and the exit pupil diameter of the optical system 21 and the pixel size, the number of pixels and the incident angle characteristics of the imaging element 31, and the shading correction information 18 may be generated by calculating the correction gain for each pixel in consideration of the peripheral light amount ratio (peripheral attenuation) of each optical system 21.

As described above, the body module 10 of the image sensor 1 can perform on the image data from the imaging module 30 the shading correction with the contents in accordance with the combination of the attached lens module 20 and imaging module 30. Therefore, if the above configuration is adopted, it is possible to realize the image sensor 1 which allows the user to select the lens module 20 and the imaging module 30 without considering performance degradation due to shading.

Second Embodiment

Hereinafter, the configuration and operation of the image sensor 1 according to the second embodiment are described with focus on places different from those of the image sensor 1 according to the first embodiment with the same reference numerals as those used in the description of the image sensor 1 according to the first embodiment. For ease of description, hereinafter, the image sensor 1 according to the L (L=first or second) embodiment is also referred to as the L image sensor 1.

Figure 6:
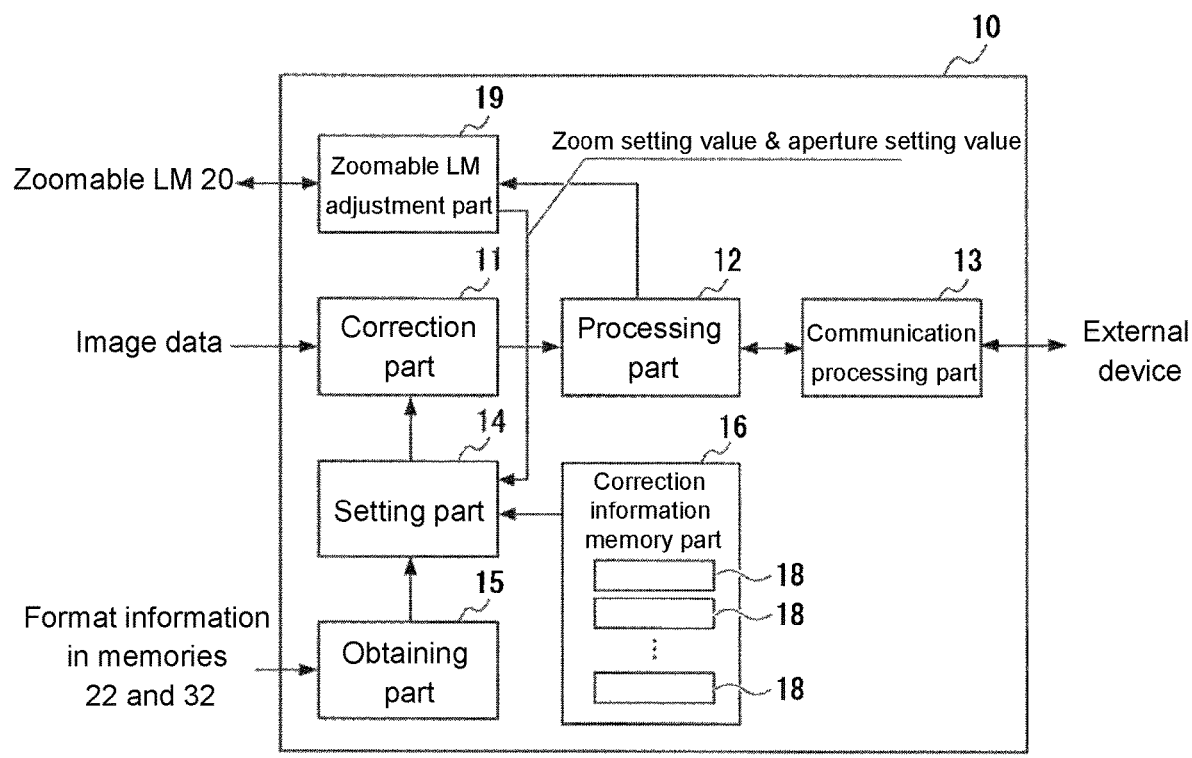
FIG. 6 is a functional block diagram for illustrating functions of a body module of the image sensor according to the second embodiment.

FIG. 6 shows a schematic configuration of the second image sensor 1 (the image sensor 1 according to the second embodiment).

Like the first image sensor 1 (see FIG. 1), the second image sensor 1 is a device configured by attaching the lens module 20 and the imaging module 30 to the body module 10. The imaging module 30 for the second image sensor 1 is the same as the imaging module 30 for the first image sensor 1. However, the lens module 20 for the second image sensor 1 includes K (≥1) types of lens modules 20 that can change zoom and aperture (hereinafter referred to as a zoomable LM 20).

Therefore, the body module 10 of the second image sensor 1 includes a zoomable LM adjustment part 19 for changing a setting related to the zoom/aperture of the zoomable LM 20. Further, the zoomable LM adjustment part 19 has a function of notifying the setting part 14, when the setting of the zoom/aperture is changed, of the current (changed) zoom setting value and aperture setting value and a function of notifying the setting part 14 of the current zoom setting value and aperture setting value in response to a predetermined request from setting part 14.

When the zoom/aperture setting value of the zoomable LM 20 is changed, the exit pupil position and the exit pupil diameter change, and as a result, the degree of shading occurring in the image data from the imaging module 30 also changes. In order to be able to cope with such changes, the correction information memory part 16 of the body module 10 of the second image sensor 1 is stored with the shading correction information 18 with respect to each combination of the zoomable LM 20 and the imaging module 30 by each combination of the zoom setting value and the aperture setting value that can be set in the zoomable LM 20. That is, when the zoomable LM 20 is capable of setting of a number of zooms and capable of setting b number of apertures, the correction information memory part 16 is stored with a×b pieces of shading correction information 18 associated with combinations of zoom setting values and aperture setting values different from one another, which are a×b pieces of shading correction information 18 associated with the combinations of the LM format information of the zoomable LM 20 and certain CM format information.

Then, the body module 10 of the second image sensor 1 is configured (programmed) so that the setting part 14 performs the following process.

The setting part 14, when notified by the obtaining part 15 of the LM format information and the CM format information, determines if the lens module 20 attached to the body module 10 is the zoomable LM 20 based on the notified CM format information. In the case that the lens module 20 attached to the body module 10 is not the zoomable LM 20, the setting part 14 reads from the correction information memory part 16 and sets in the correction part 11 the shading correction information 18 associated with the combination of the LM format information and the CM format information notified by the obtaining part.

On the other hand, in the case that the lens module 20 attached to the body module 10 is the zoomable LM 20, the setting part 14 obtains the current zoom setting value and aperture setting value from the zoomable LM adjustment part 19. And then the setting part 14 reads from the correction information memory part 16 and sets in the correction part 11 the shading correction information 18 associated with the combination of the LM format information and the CM format information notified by the obtaining part 15 and associated with the combination of the zoom setting value and the aperture setting value obtained from the zoomable LM adjustment part 19.

Further, the setting part 14, when notified by the zoomable LM adjustment part 19 of the current zoom setting value and aperture setting value, reads from the correction information memory part 16 and sets in the correction part 11 the shading correction information 18 associated with the combination of the LM format information and the CM format information notified by the obtaining part 15 at the time of turning on the power and associated with the combination of the zoom setting value and the aperture setting value notified by the zoomable LM adjustment part 19 this time.

As described above, even when the zoom/aperture of the zoomable LM 20 is changed, the body module 10 of the image sensor 1 according to the present embodiment can perform on the image data from the imaging module 30 the shading correction with the contents in accordance with the changed situation. Therefore, if the above configuration is adopted, it is possible to realize the image sensor 1 which allows the user to select the zoomable LM 20 as the lens module 20, i.e. the image sensor 1 which allows the user to select the lens module 20 and the imaging module 30, without considering performance degradation due to shading.

<Modified Example>

Figure 7:
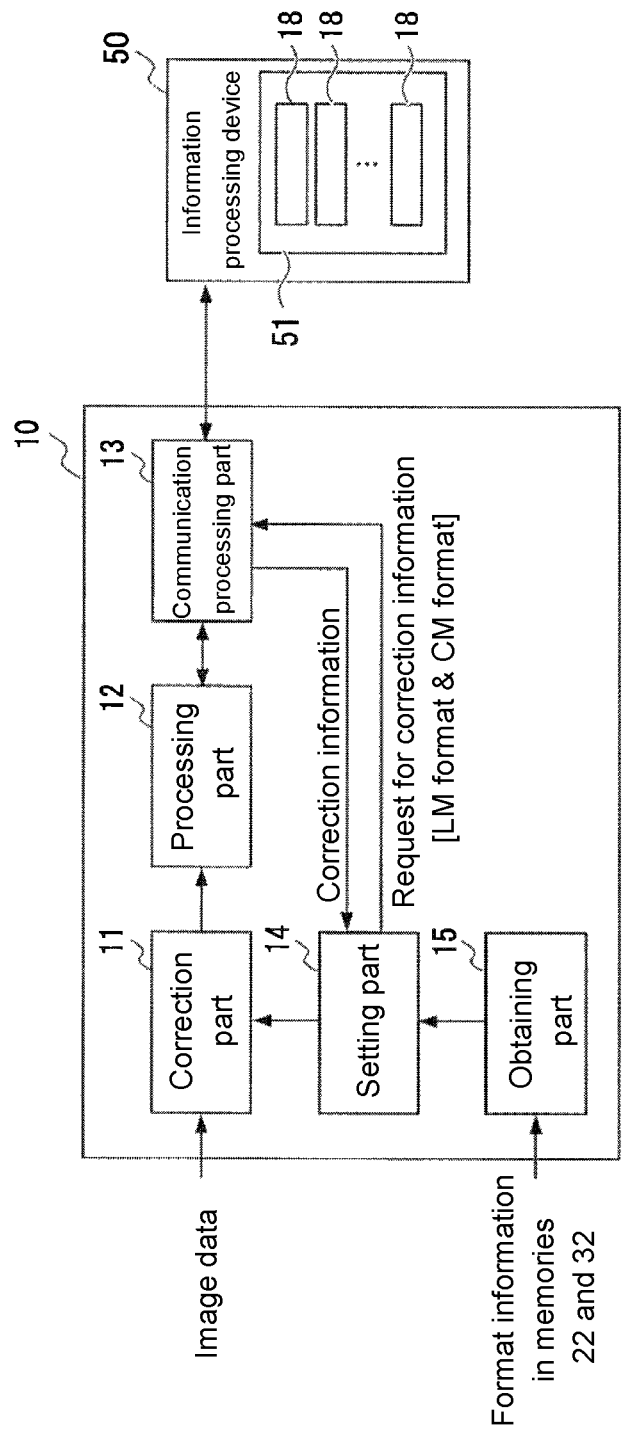
FIG. 7 is a diagram for illustrating a modified example of the image sensor.

The image sensor 1 according to each of the above-described embodiments can have various modifications. For example, after an external device (the information processing device 50, another image sensor 1, storage on the Internet, etc.) for storing the shading correction information 18 for each combination is prepared, the body module 10 of the image sensor 1 according to each embodiment may be modified into a module for obtaining the shading correction information 18 suitable for the combination of the attached lens module 20 and imaging module 30 from the external device. When the body module 10 of the image sensor 1 according to the first embodiment is modified into such a module as shown in FIG. 7, for example, the correction information memory part 16 may be removed from the body module 10, and the setting part 14 may be modified into a unit for obtaining the shading correction information 18 stored in a correction information memory part 51 (shown as correction information in the drawing) from the external device (shown as the information processing device 50 in the drawing) by transmitting a request for the correction information including a combination of the LM format information and the CM format information notified by the obtaining part 15.

Further, when desired shading correction information is not stored in the correction information memory part 16, the setting part 14 of the body module 10 according to each embodiment may be modified into a module for obtaining the shading correction information from an external device. In order to reduce the storage capacity required for storing the shading correction information, when there are multiple combinations of the lens module 20 and the imaging module 30 with appropriate shading correction information close to each other, one piece of shading correction Information may be associated with the multiple combinations.

Instead of having the nonvolatile memory 22, the lens module 20 may be modified into a module provided with a resistor having a resistance value according to the format of its own module, a dip switch in which each switch is turned on/off to indicate the format of its own module and a circuit or the like equivalent to the dip switch. A similar modification is also possible for the imaging module 30.

Figure 8:
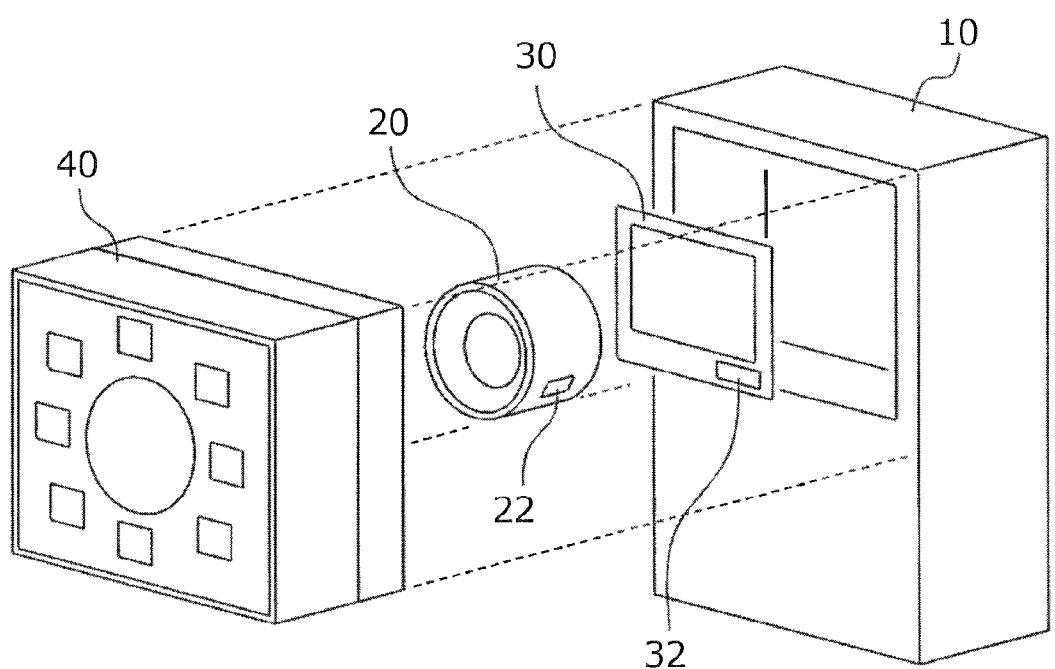
FIG. 8 is a diagram for illustrating a modified example of the image sensor.

The lens module 20 may be modified into a module including a light source (an LED, etc.) for illuminating a subject. Further, as schematically shown in FIG. 8, the body module 10 may be modified into a module to which an illumination module 40 including a light source for illuminating a subject is attachable. Regarding the forms in which the smart camera is provided (delivery forms), the modules may be provided separately to be assembled on the user side, or the smart camera may be provided with the illumination module and the lens module incorporated in the sensor body. In the case of the latter form, there is no need to adjust the optical conditions on the user side, so it has the advantage that the image sensor can be introduced more easily.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

<Appendix>

(1) An image sensor (1) characterized in including a body module (10) and a lens module (20) and an imaging module (30) attached to the body module (10), wherein the body module (10) includes:

an obtaining part for obtaining from the attached imaging module (30) format information indicating a format of the imaging module (30) and for obtaining from the attached lens module (20) format information indicating a format of the lens module (20);

a correction part capable of setting shading correction information and for performing a shading correction on image data outputted by the imaging module (30) according to the set shading correction information; and a setting part for obtaining from a predetermined device, which stores the shading correction information to be set in the correction part for each combination of the format information of the imaging module (30) and the format information of the lens module (20), and setting in the correction part the shading correction information associated with the combination of the format information of the imaging module (30) and the format information of the lens module (20) obtained from the obtaining part.

(2) A body module (10) configured to be attachable by a lens module (20) and an imaging module (30), characterized in including:

an obtaining part for obtaining from the attached imaging module (30) format information indicating a format of the imaging module (30) and for obtaining from the attached lens module (20) format information indicating a format of the lens module (20);

a correction part capable of setting shading correction information and for performing a shading correction on image data outputted by the imaging module (30) according to the set shading correction information; and a setting part for obtaining from a predetermined device, which stores the shading correction information to be set in the correction part for each combination of the format information of the imaging module (30) and the format information of the lens module (20), and setting in the correction part the shading correction information associated with the combination of the format information of the imaging module (30) and the format information of the lens module (20) obtained from the obtaining part.

What is claimed is:

1. An image sensor comprising
   a body module;
   a lens module, detachably coupled to the body module, the lens module having a first memory storing a first format information corresponding to the lens module;
   an imaging module, detachably coupled to the body module, the image module having a second memory storing a second format information corresponding to the image module, wherein
   the body module comprising a controller configured to
      obtain the first formation information from the attached lens module by accessing the first memory disposed in the lens module and obtain the second format information from the attached imaging module by accessing the second memory disposed in the imaging module, wherein the first formation indicates the format of the lens module, and the second format information indicates the format of the imaging module,
      set a shading correction information and perform a shading correction on image data outputted by the imaging module according to the set shading correction information, and
      obtain the shading correction information from one of a plurality of shading correction information stored in a predetermined device, wherein the shading correction information is associated with the combination of the format information of the imaging module and the format information of the lens module.

2. The image sensor according to claim 1, wherein the predetermined device is a nonvolatile memory included in the body module.

3. The image sensor according to claim 1, wherein the predetermined device is a device outside the body module.

4. The image sensor according to claim 1, wherein when the attached lens module is a zoomable lens module with adjustable zoom and aperture, the predetermined device is stored with the shading correction information with respect to the combination of the first format information of the zoomable lens module and the second format information of the imaging module by each combination of a plurality of zoom setting values and a plurality of aperture setting values that can be set in the zoomable lens module, the controller of the body module being further configured to adjust settings of the zoom and the aperture of the zoomable lens module, wherein when the zoomable lens module is attached to the body module, the controller of the body module is configured to obtain from the predetermined device the shading correction information associated with the second format information of the imaging module and the first format information of the lens module associated with the combination of the zoom setting value and the aperture setting value of the zoomable lens module.

5. The image sensor according to claim 2, wherein when the attached lens module is a zoomable lens module with adjustable zoom and aperture, the predetermined device is stored with the shading correction information with respect to the combination of the first format information of the zoomable lens module and the second format information of the imaging module by each combination of a plurality of zoom setting values and a plurality of aperture setting values that can be set in the zoomable lens module, the controller of the body module being further configured to adjust settings of the zoom and the aperture of the zoomable lens module, wherein when the zoomable lens module is attached to the body module, the controller of the body module is configured to obtain from the predetermined device the shading correction information associated with the second format information of the imaging module and the first format information of the lens module associated with the combination of the zoom setting value and the aperture setting value of the zoomable lens module.

6. A body module configured to be attachable by a lens module and an imaging module, wherein the lens module has a first memory storing a first format information corresponding to the lens module and the imaging module has a second memory storing a second format information corresponding to the image module, the body module comprising a controller configured to obtain the first formation information from the attached lens module by accessing the first memory disposed in the lens module and obtain the second format information from the attached imaging module by accessing the second memory disposed in the imaging module, wherein the first formation indicates the format of the lens module, and the second format information indicates the format of the imaging module, set a shading correction information and perform a shading correction on image data outputted by the imaging module according to the set shading correction information, and obtain the shading correction information from one of a plurality of shading correction information stored in a predetermined device, wherein the shading correction information is associated with the combination of the format information of the imaging module and the format information of the lens module.

* * * * *